3,219,431
METHOD FOR CONTROLLING UNDESIRED PLANTS
Peter L. de Benneville, Philadelphia, and Heinz W. Blessing, Levittown, Pa., assignors to Rohm & Haas Company, Philadelphia, Pa., a corporation of Delaware
No Drawing. Filed Dec. 27, 1962, Ser. No. 247,487
3 Claims. (Cl. 71—2.7)

This application is a continuation-in-part of application Serial No. 834,409, filed August 18, 1959, now abandoned.

This invention deals with heribicidal compositions. It specifically deals with herbicidal compositions comprising a herbicidally effective amount of a specific unsaturated chlorinated cyanoester.

The ester employed in the present invention may be represented by the formula

NCCCl=CR'COOR in which R represents an alkyl group of one to eight carbon atoms, such as methyl, ethyl, n-propyl, isopropyl, n-butyl, n-octyl, 2-ethylhexyl, and the like, and R' represents a hydrogen atom or a methyl group. Within the above definition, it is to be construed that the structural formula includes stereoisomers.

These esters may be prepared by dehydrochlorinating a compound having the formula NCCCl$_2$CHR'COOR wherein the R and R' have the meanings set forth hereinbefore. The compounds having the formula NCCCl$_2$CHR'COOR are prepared according to the method shown in our co-pending application Serial No. 834,408, filed August 18, 1959, now U.S. Patent No. 3,133,954. Typical embodiments of these esters include methyl 3,3-dichloro-3-cyanopropionate, ethyl 3,3-dichloro-3-cyanopropionate, n-butyl 3,3 - dichloro - 3 - cyanopropionate, methyl 3,3 - dichloro - 3 - cyanoisobutyrate, isopropyl 3,3 - dichloro - 3 - cyanoisobutyrate, n - butyl 3,3 - dichloro - 3 - cyanoisobutyrate, and 2 - ethylhexyl 3,3 - dichloro - 3 - cyanopropionate.

The dehydrochlorination is achieved preferably by heating the ester reactant in the presence of a monoamine salt until no more hydrogen chloride is evolved. This stage may be determined by testing with ammonia or by known titration methods. It is preferred to use the amine in the form of the hydrogen halide salt. The dehydrohalogenation starts at about 60° C. but is more advantageously conducted in the range of 100° to 180° C., preferably 110° to 140° C.

Alternatively, the dehydrohalogenation may be conducted at room temperatures or less, such as at 0° C., in the presence of a neutral solvent, such as benzene, toluene, or xylene by employing a tertiary amine in its free-base form and in stoichiometric amounts. It is preferred to use the higher temperatures and the amine in its acid salt form because the precess is simpler, since truly catalytic amounts of the amine in its acid salt form may be employed.

Typical monoamine salts which may be employed include those derived from the various alkyl amines, such as methyl, ethyl, butyl, amyl, hexyl, octyl, dodecyl, octadecyl, diamyl, dipropyl, dibutyl, dioctyl, di-2-ethylhexyl, trimethyl, triethyl, tributyl, octyl, dimethyl, dodecyldimethyl, benzyldimethyl, octadecyldimethyl, cyclohexyl, and dicyclohexyl. Other suitable monoamines include pyridine, lutidine, collodine, picoline, aniline, quinoline, morpholine, piperidine, and these amines having alkyl substituents. It is preferred to employ tertiary amines, such as quinoline, pyridine, triethylamine, trimethylamine, and the like, particularly in the form of their acid salts and employing the higher temperature range discussed heretofore. In such instances, maximum yields are obtained in minimum times employing catalytic amounts of the stated monoamine salt. In summation, there may be employed a monoamine which forms acid salts that are relatively stable at the reacting temperatures. At the conclusion of the reaction, the product is separated by distillation.

Typical tertiary amines which may be employed in stoichiometric quantities in the presence of a solvent at lower temperatures are trimethylamine, triethylamine, pyridine, N-methyl piperidine, N-methyl pyrrolidine, benzyldimethylamine, quinoline, and the like. The amine hydrochloride precipitates from the hydrocarbon solvent, and this is removed by filtration. The filtrate is then distilled to recover solvent and the product.

These ester products are usually present in the form of the two geometric isomers:

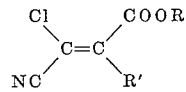

and

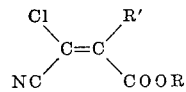

These can be detected by vapor phase chromatography, and frequently can be substantially separated one from the other by careful distillation. In the utilization of the material, the presence of the two isomers is generally of little consequence, and the mixture may be used.

The unsaturated chlorinated cyanoesters employed in the present herbicidal compositions may be prepared according to the following illustrative examples. Parts by weight are used throughout.

*Example 1*

A mixture of 273.2 parts of methyl 3-cyano-3,3-dichloropropionate and 8 parts of quinoline hydrochloride is heated at 110° to 140° C. until gas evolution stops (about 3 hours). The hydrogen chloride formed during the dehydrochlorination is flushed into a one-half normal aqueous sodium hydroxide solution by means of a stream of nitrogen. The reaction mixture is distilled using a Widmer column. The product distills at 77.5 to 88.5° C. at 4 to 10 mm. absolute pressure. The yield is 80%. The product has an $n_D^{25}$ value of 1.478–1.4760 and contains average values of 41.50% carbon (41.2% theoretical), 2.92% hydrogen (2.75% theoretical), 24.41% chlorine (24.36% theoretical), and 9.51% nitrogen (9.62% theoretical). The presence of two stereoisomers in the product is confirmed by vapor phase chromatography.

Similarly, there are prepared from ethyl 3-cyano-3,3-dichloropropionate a colorless liquid distilling at 40°–55° C. at 0.5 mm. Hg, giving the correct nitrogen analysis for the isomers of ethyl β-chloro-β-cyanoacrylate and from n-butyl 3-cyano-3,3-dichloropropionate, a slightly yellow oil distilling at 50°–80° C. at 0.5 mm. Hg, and analyzing correctly for the mixture of isomers of n-butyl β-chloro-β-cyanoacrylate.

In a similar fashion, when a mixture of 294 parts of methyl 3,3-dichloro-3-cyano-2-methylpropionate, 15 parts of quinoline hydrochloride and 0.5 parts of diphenyl-p-phenylene diamine is heated at 135°–175° C. for 2.5 hours, hydrogen chloride is evolved to the extent of 82% of the theoretical. When the product is distilled, there is isolated 133 parts of colorless liquid boiling at 92°–105° C. at 10 mm. of Hg, with $n_D^{25}$ varying from 1.4688 to 1.4744 (reflecting the presence of stereoisomers). All cuts contain close to the theoretical amount of chlorine for the dehydrochlorinated product, methyl β-chloro-β-cyano-α-methylacrylate.

Example 2

A solution of 196 parts of methyl 2-methyl-3-cyano-3,3-dichloropropionate in 500 parts of benzene is cooled to 0°–5° C. The solution is stirred and 101 parts of triethylamine is added slowly from a dropping funnel at such a rate that the temperature of the reaction mixture does not exceed 10° C. The precipitated amine hydrochloride is filtered from the reaction mixture and washed with benzene. The filtrates are combined and distilled at reduced pressure. The product distils at 95°–102° C. at 5 to 10 mm. absolute pressure and is obtained in 85% yield. The product has an $n_D^{25}$ value of 1.4706–1.4744 and analyzes correctly for methyl β-cyano-β-chloromethacrylate. The presence of two stereoisomers in the product is confirmed by vapor phase chromatography.

In similar fashion, from n-butyl-3-cyano-3,3-dichloro-2-methylpropionate, there is obtained a colorless liquid boiling at 60°–95° C. at 1 mm. of Hg, corresponding in analysis to the two expected isomers of n-butyl β-chloro-β-cyanomethacrylate.

In similar fashion, 140 parts of 2-ethylhexyl 3-cyano-3,3-dichloropropionate in 400 parts of toluene is cooled to 10° C. The solution is stirred and 40 parts of pyridine is added slowly with ice-water cooling. The precipitated pyridine hydrochloride is removed by filtration and the toluene extracts are stripped at reduced pressure. There remains a light yellow oil which contains on analysis about 29% nitrogen close to the theoretical for 2-ethylhexyl β-chloro-β-cyanoacrylate. The precipitated pyridine hydrochloride weighs slightly less than the amount required by the abstraction of one equivalent of hydrogen chloride.

In the same way, 2-ethylhexyl β-chloro-β-cyanomethacrylate is prepared as an oil, obtained after stripping the solvent, and essentially pure by elemental analysis.

The unsaturated chlorinated cyanoesters are then incorporated into a carrier to provide the valuable herbicides of the present invention. The present herbicides are quite effective against many monocotyledenous and dicotyledenous plants according to standard procedures and are particularly effective in post-emergence applications. Herbicidal effects are noticed in concentrations of about one pound per acre but preferred results are obtained when the ester is employed in a concentration of about 5 to 10 pounds or more per acre and applied as a spray, wettable powder or dust. Particularly outstanding in this respect are herbicidal compositions comprising methyl 3-cyano-3-chloroacrylate or ethyl 3-cyano-3-chloroacrylate. The unsaturated chlorinated cyanoesters employed in the present invention may be used alone, with each other in any combinations and amounts or with other herbicidal compounds. There may also be employed other pesticides, if desired. The unsaturated chlorinated cyanoesters used in the present herbicidal compositions, when applied at a rate of at least about 5 pounds per acre of active ingredient, give excellent control of crabgrass, millet, mustard, wild carrot, lambs quarter, sorrel, dock, mallow, and pigweed. At higher concentrations, especially at a rate of about 10 pounds or more per acre of active ingredient, the present compositions are quite effective also against foxtail and Sudan grass.

The present herbicidal compositions may be used in the form of dusts, wettable powders or sprays. The present herbicidal compositions in dust form will contain from about 1% to 10% or more of one or more of the unsaturated chlorinated cyanoesters described hereinbefore. These esters may be the sole herbicide but the dust may contain one or more others, if desired. The dust may be prepared by mixing the ester described hereinbefore or a solution thereof in an inert volatile solvent with one or more finely particled solid carriers such as a clay, diatomaceous earth, pyrophyllite, talc, or the like. Dispersing agents such as sodium lignin sulfonate or condensed formaldehydenaphthalene sodium sulfonate may be used.

The herbicidal compositions of the present invention in a wettable powder form may be similarly prepared except that a larger proportion of active agent is used and a wetting agent is incorporated. Preferably, in wettable powder form, the present compositions would contain about 20 to 25% by weight of an active agent, 1 to 2% by weight of a dispersing agent, 1 to 3% by weight of a wetting agent, such as an alkylphenoxypolyethoxyethanol, a sodium alkylbenzenesulfonate, and the like, and the balance one or more finely particled solids. Typical of the above wetting agents are octyl phenoxypolyethoxyethanol containing 8 to 12 moles of ethylene oxide, sodium dodecyl benzenesulfonate, among others.

The present herbicidal compositions may also be used as a solution. There may be dissolved in a water-miscible solvent, such as acetone, one of the aforedescribed esters and the solution extended with water. Generally an emulsified concentrate may be prepared by dissolving one of the aforementioned esters in a solvent, such as toluene, xylene, or the like, and including a solvent-soluble emulsifier. Typical emulsifiable concentrations are prepared from about 20% to 25% by weight of one of the aforedescribed unsaturated chlorinated cyanoesters, from 2% to 5% by weight of a wetting agent such as an octylphenoxypolyethoxyethanol or a comparable polyethoxyethanol wetting agent and calcium dodecylbenzenesulfonate or calcium dioctyl sulfosuccinate.

As a wettable powder or solution the present herbicidal compositions are applied in sprays containing about one-tenth of a pound to two pounds or more of the described unsaturated chlorinated cyanoesters per 100 gallons of water.

We claim:

1. A method for controlling undesired plant life comprising applying to the locus of said plant life a herbicidally effective amount of a herbicidal composition comprising a carrier and a herbicidally effective amount of a compound having the formula $$NCCCl=CR'COOR$$

in which

R is alkyl of one to eight carbon atoms, and
R′ is a member from the class consisting of hydrogen and methyl.

2. The method according to claim 1 wherein said composition is employed in the amount of at least 1 lb. per acre.

3. The method according to claim 1 wherein said composition is employed in the amount of about 5 to about 10 lbs. per acre.

References Cited by the Examiner

UNITED STATES PATENTS

| | | | |
|---|---|---|---|
| 2,224,022 | 12/1940 | Kurtz | 260—465.4 |
| 2,437,231 | 3/1948 | Mowry | 260—85.5 |
| 3,074,998 | 1/1963 | Whetstone et al. | 71—2.7 X |
| 3,106,566 | 10/1963 | McCall et al. | 260—465.4 X |

OTHER REFERENCES

Urushibara: Chemical Abstracts, volume 25, 2119 (1925).

LEWIS GOTTS, *Primary Examiner.*